United States Patent [19]

Scheffee et al.

[11] Patent Number: 5,747,730
[45] Date of Patent: May 5, 1998

[54] PYROTECHNIC METHOD OF GENERATING A PARTICULATE-FREE, NON-TOXIC ODORLESS AND COLORLESS GAS

[75] Inventors: Robert S. Scheffee, Lorton, Va.; Robert Lee Thibodeau, Knoxville, Tenn.; Brian K. Wheatley, Marshall, Va.

[73] Assignee: Atlantic Research Corporation, Gainesville, Va.

[21] Appl. No.: 663,009

[22] Filed: Jun. 7, 1996

Related U.S. Application Data

[63] Continuation-in-part of Ser. No. 414,469, Mar. 31, 1995, abandoned.

[51] Int. Cl.[6] .................... C06B 31/32; C06B 21/00; B60R 21/28
[52] U.S. Cl. .................... 149/47; 149/19.91; 60/205; 264/3.1; 280/741
[58] Field of Search .................... 149/19.91, 47; 280/741; 264/3.1; 60/205

[56] References Cited

U.S. PATENT DOCUMENTS

| | | |
|---|---|---|
| 3,613,597 | 10/1971 | Warren . |
| 3,739,574 | 6/1973 | Godfrey . |
| 3,845,970 | 11/1974 | Herrmann . |
| 3,954,528 | 5/1976 | Chang et al. . |
| 4,111,728 | 9/1978 | Ramnarace . |
| 5,125,684 | 6/1992 | Cartwright . |
| 5,336,439 | 8/1994 | Forsberg et al. . |
| 5,351,619 | 10/1994 | Chan et al. . |
| 5,431,103 | 7/1995 | Hock et al. ............ 280/741 |
| 5,507,891 | 4/1996 | Zeigler ............ 149/47 |
| 5,545,272 | 8/1996 | Poole et al. ............ 149/48 |
| 5,551,725 | 9/1996 | Ludwig ............ 280/741 |

Primary Examiner—Edward A. Miller
Attorney, Agent, or Firm—Lowe, Price, LeBlanc & Becker

[57] ABSTRACT

An essentially particulate-free, non-toxic, odorless and colorless gas is generated in a pyrotechnic inflator device by using a eutectic solution of ammonium nitrate, guanidine nitrate and/or aminoguanidine nitrate, and minor amounts of polyvinyl alcohol and either potassium nitrate or potassium perchlorate. Ballistic modifiers such as triaminoguanidine nitrate (TAGN) or nitroguanidine (NQ) may be used as needed.

10 Claims, 5 Drawing Sheets

Figure 2

50% AN/50% AGN Eutectic Propellant
Exhaust Gas Analysis (60 Liter Tank) from 20GM Propellant

|  | Analysis (ppm) | GM Spec (ppm) |
|---|---|---|
| NO | 10 | 532 |
| $NO_2$ | 2.5 | 107 |
| $NH_3$ | 52 | 1,596 |
| HCN | <0.1 | 266 |
| $H_2CO$ | <0.05 | 107 |
| CO | 350 | 4,788 |
| $CO_2$ | 1,500 | 399,000 |

Figure 4

THERMAL STABILITY OF AN/AGN EUTECTICS

| COMP ID | COMPOSITION, WT% | | | | TEMP RANGE, °C | % CHANGE IN CRUSH STRENGTH | PELLET DIAMETER | NO. OF CYCLES |
|---|---|---|---|---|---|---|---|---|
| | AN | AGN | KN | PVA | | | | |
| 97 | 60 | 28 | 7 | 5 | -40/+107 | -80 | 6.3 | 50 |
| | | | | | -30/+90 | -40 | 1.5 | 300 |
| 96 | 62 | 28 | 5 | 5 | -40/+107 | -44 | 5.4 | 100 |
| | | | | | -30/+90 | 7.4 | 1.5 | 300 |
| 95 | 65 | 27 | 3 | 5 | -40/+107 | -80 | 10 | 168 |
| | | | | | -30/+90 | -3.1 | 1.5 | 300 |
| 115 | 0 | 92 | 3 | 5 | -40/+107 | 4.5 | 0.6 | 168 |
| | | | | | -30/+90 | 0.15 | 0.38 | 300 |
| 103 | | 95 | | 5 | -40/+107 | 19 | 0.38 | 200 |
| | | | | | -30/+90 | 20 | -0.19 | 300 |

Figure 5

THERMAL STABILITY OF AN/GN EUTECTICS

| COMP ID | COMPOSITION, WT% | | | | | % CHANGE AFTER 200 CYCLES BETWEEN -40 AND +107 °C | |
|---|---|---|---|---|---|---|---|
| | AN | GN | KN | PVA | OTHER | CRUSH STRENGTH | DIAMETER |
| 111 | 88 | | | 12 | | 25 CYCLES | 20 |
| 84 | 31.3 | 54.2 | 9.5 | 5 | | -3.1 | 1.2 |
| 94 | 57 | 31 | 7 | 5 | | 21 | 1.3 |
| 93 | 60 | 30 | 5 | 5 | | 35 | 1.3 |
| 92 | 63 | 29 | 3 | 5 | | -55 | 14 |
| 120 | 57 | 34 | 5 | 4 | | -11 | 1.5 |
| 121 | 54 | 38 | 5 | 3 | | 0.44 | 1.3 |
| 132 | 50 | 45 | 5 | 0 | | -10 | 7.0 |
| 125 | 61 | 31 | 5 | 3 | | -1.3 | 1.5 |
| 126 | 61 | 31 | 5 | 3 | (AS POWDER) | -26 | 3.8 |
| | 50 | 50 | 0 | 0 | DISINTEGRATED AFTER 5 CYCLES | | |
| 110 | 55 | 31 | 0 | 5 | 9 KClO4 | 19 (168 CYCLES) | 1.3 |
| 99 | 59 | 30 | 0 | 5 | 6 " | 17 (50 CYCLES) | 5.8 |
| 114 | 82 | 0 | 0 | 12 | 6 " | -54 (24 CYCLES) | 19 |
| 87 | 0 | 65 | 0 | 0 | 35 " | -3.4 | +1.5 |

PYROTECHNIC METHOD OF GENERATING A PARTICULATE-FREE, NON-TOXIC ODORLESS AND COLORLESS GAS

This application is a continuation-in-part of application U.S. Ser. No. 08/414,469, filed Mar. 31, 1995, which is abandoned.

FIELD OF THE INVENTION

The instant invention involves an improved method of using a eutectic solution of ammonium nitrate (AN), guanidine nitrate (GN) and/or aminoguanidine nitrate (AGN), and with minor amounts of polyvinyl alcohol (PVA) and either potassium nitrate (KN) or potassium perchlorate (KP) in a pyrotechnic inflator to generate an essentially particulate-free, non-toxic, odorless and colorless gas, for various purposes, such as inflating a vehicle occupant restraint, i.e., an air bag for an automotive vehicle.

The propellants have also been found feasible for use in hybrid inflators for air bags.

BACKGROUND OF THE INVENTION

The present invention relates generally to solid composite propellant compositions and more particularly to solid composite propellant compositions useful as gas generators as described in related concurrently filed application Ser. No. 08/508,350.

Recently, there has been a great demand for new gas generating propellants which are cool burning, non-corrosive and yield a high volume of gas and low particulates because attempts to improve existing gas generative compositions have been unsuccessful for various reasons. For example, while the addition of certain modifiers, such as metal carbonates, has lowered the flame temperature and yielded acceptable gas production, these same modifiers have contributed to the production of undesirable particulates. In turn, other modifiers utilized in the past, such as alkali metal chlorates, while not producing corrosive materials, have not succeeded in lowering the flame temperature significantly or increasing gas evolution, and also produce particulates.

Gas generator compositions of interest here contain ammonium nitrate (AN) as the oxidizer and rubbery binders as the fuel. Ammonium nitrate is the most commonly used oxidizer since it yields no particulates and non-corrosive combustion products. Further, its use results in lower flame temperatures than do other oxidizers. Ammonium nitrate is cheap, readily available and safe to handle.

The main objection to ammonium nitrate is that it undergoes certain phase changes during temperature variations, causing cracks and voids if any associated binder is not sufficiently strong and flexible enough to hold the composition together. Also, ammonium nitrate compositions are hygroscopic and difficult to ignite, particularly if small amounts of moisture have been absorbed. Since said compositions do not sustain combustion at low pressures, various combustion catalysts are added to promote ignition and low pressure combustion as well as to achieve smooth, stable burning. Gas generator compositions used for air bags should contain no metallic additives or even oxidizers such as ammonium perchlorate, because these give particulates and corrosive exhaust gases respectively. Commonly used additives, such as ammonium dichromate, copper chromite, etc., are also disadvantageous since they all produce toxic solids in the exhaust gases.

THE PRIOR ART

The art is replete with instances of compositions containing a guanidine-type compound with an oxidizer, such as ammonium nitrate. For example, in U.S. Pat. No. 3,031,347, guanidine nitrate and ammonium nitrate are listed together at column 2, as well as in Examples 3 and 5. However, compared with the present invention, not only does the guanidine compound lack an amino group, as in the aminoguanidine nitrate embodiment, but the composition disclosed in the patent is not a eutectic solution-forming mixture. Likewise, see U.S. Pat. No. 3,739,574, col. 2, in the table. On the other hand, U.S. Pat. No. 3,845,970, at column 3, discloses a list of solid compositions for generating gas in a shock absorption system. Among the components of the various compositions are ammonium nitrate and aminoguanidine nitrate. The two materials are not disclosed in admixture and, obviously, are not in a eutectic composition.

Similarly, U.S. Pat. No. 3,954,528 discloses new solid composite gas generating compositions. Among the ingredients mentioned are ammonium nitrate and triaminoguanidine nitrate. See Examples 2 through 5. However, neither the specified components of the aminoguanidine nitrate compositions at hand nor any eutectic compositions, are disclosed therein.

In U.S. Pat. No. 4,111,728, the inventor discloses ammonium nitrate with small amounts of guanidine nitrate. See column 2 and the table at columns 3–4. However, the compositions do not include aminoguanidine nitrate and do not characterize any composition as forming a eutectic solution.

U.S. Pat. No. 5,125,684 also discloses propellant compositions containing dry aminoguanidine nitrate and an oxidizer salt containing a nitrate anion. However, the disclosure is deficient with respect to the present invention since it fails to disclose the specific combination of components of this invention and does not mention eutectics.

Finally, U.S. Pat. No. 5,336,439 concerns salt compositions and concentrates used in explosive emulsions. As disclosed at columns 37 and 38, ammonium nitrate is one of the ingredients for forming the patentee's composition, while at column 20, line 51, aminoguanidine is indicated as also being an appropriate component. Nevertheless, like the other disclosures mentioned, the patent fails to disclose a specific composition including the same nitrates as are disclosed herein and clearly does not teach a eutectic composition containing said components.

BRIEF DESCRIPTION OF THE DRAWINGS

FIG. 2 is an analysis of exhaust gases.

FIG. 4 is a summary of thermal stabilities of AN/AGN eutectics.

FIG. 5 is a summary of a thermal stabilities of AN/GN eutectics.

SUMMARY OF THE INVENTION

Figure 1:
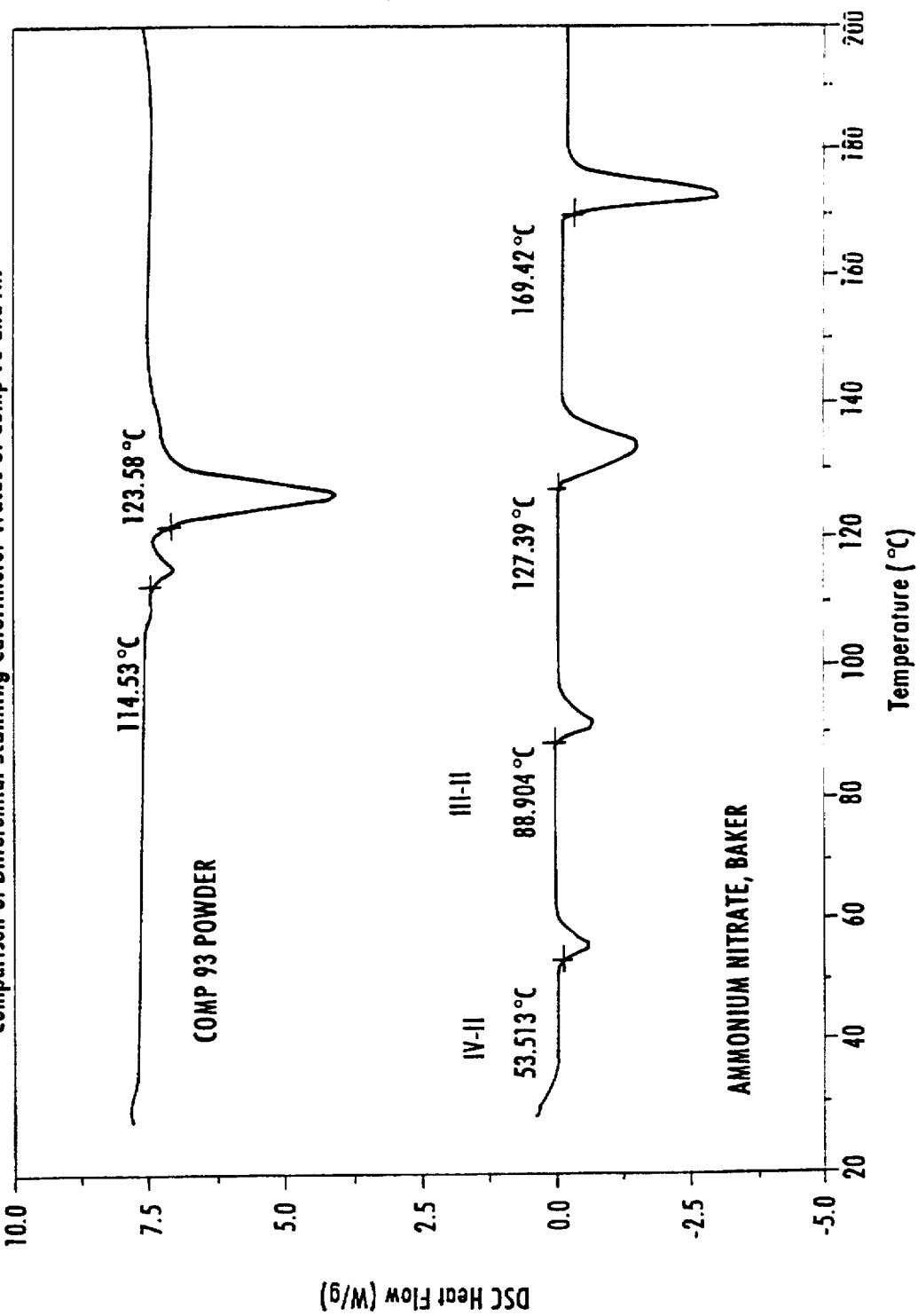
FIG. 1 is a comparison of differential scanning calorimeter traces.

The invention herein involves eutectic mixtures of ammonium nitrate (AN), guanidine nitrate (GN) and/or aminoguanidine nitrate (AGN), triaminoguanidine nitrate (TAGN) or nitroguanidine (NQ) and small amounts of polyvinyl alcohol (PVA) and either potassium nitrate (KN) or potassium perchlorate (KP) as well as a method of generating an essentially particulate-free, non-toxic, odorless and colorless gas for various purposes, such as the inflation of an air bag in an automotive vehicle. In generating a particulate-free, non toxic, odorless and colorless gas, an enclosed chamber having exit ports is provided; a solid eutectic solution comprising AN, GN (and/or AGN or TAGN or NQ), KN, (and/or KP), and PVA is disposed as a propellant within said chamber; means are then provided for igniting said eutectic solution in response to a sudden deceleration being detected by a detection device in the chamber, whereby gas is instantly generated and conducted through the exit ports of the chamber through a diffuser to accomplish a desired function, such as inflating an automotive vehicle air bag.

Eutectic mixture of AN, GN and/or AGN, or TAGN or NQ and minor amounts of KN and/or KP, and PVA have been found to eliminate pellet cracking and substantially reduce ammonium nitrate phase change due to temperature cycling. Although the addition of about 1 to about 2% potassium nitrate to an AN/GN eutectic totally eliminates the ammonium nitrate phase change, it is not sufficient to prevent cracking of the pressed pellet upon temperature cycling. At least about 5% by weight KN, or at least about 9% by weight KP, and at least about 3% by weight PVA are required. In addition, other chemicals, especially triamino-guanidine nitrate, are used in the propellant to aid ignition, give smooth burning, modify burning rates and give lower flame temperatures.

DESCRIPTION OF THE PREFERRED EMBODIMENT

To achieve the advantages of employing ammonium nitrate, e.g., low cost, availability and safety, while avoiding its drawbacks, e.g., cracks and voids in the pressed pellet when subjected to temperature cycling, it is proposed to mix the ammonium nitrate oxidizer with guanidine nitrate and/or aminoguanidine nitrate, triaminoguanidine nitrate or nitroguanidine, the potassium nitrate or potassium perchlorate, and the polyvinyl alcohol and then form a eutectic solution which avoids some of the problems previously encountered and discussed above. The oxidation ration ($O_R$) of the mixture should be slightly less than unity, say 0.95, where $O_R$ is defined as the ratio of available oxygen in the formulation to that required to burn the carbon, hydrogen, and potassium to carbon dioxide, water, and potassium oxide respectively. Potassium chloride is the product of the composition when potassium perchlorate is used in the formulation. The resultant eutectic in the form of a pressed pellet results in a propellant grain to produce an essentially particulate-free, non-toxic, odorless, and colorless gas for inflating an air bag, but without the tendency of the pellet to crack (with the eliminated phase change of the AN) due to temperature cycling. Conventionally, the propellant is ignited with mixtures of boron and potassium nitrate, such as "2C granules", made by Tracor, Inc. (18% boron with about 82% $KNO_3$).

In addition, it has been discovered that the same eutectic employed to generate the gases may also be used as the igniter in the inflator device. By so utilizing the same eutectic for igniting the propellant, the inventors are able to eradicate particulates that would otherwise be present in the exhaust due to the use of "dirty" ignition materials, such as boron/potassium nitrate. For use as an igniter, the eutectic is provided as a powder, granulate, monolithic composite or any other form that may conveniently be disposed in the generator. This use of the noted eutectic as an igniter is not limited to its employment in conjunction with the same composition as generant, but is effective as a general-purpose smokeless igniter.

The following composition (Comp 93) is well-suited for use as a propellant to inflate air bags:

about 30% by weight guanidine nitrate (GN)
about 60% by weight ammonium nitrate (AN)
about 5% by weight potassium nitrate (KN)
about 5% by weight polyvinyl alcohol (PVA)

The combination of all four ingredients not only eliminates the phase changes of AN as shown in FIG. 1, but also enables pressed pellets of the composition to withstand temperature cycling requirements for air bags. This latter phenomenon is demonstrated below in the examples.

The above-described eutectic, when used as the generant in pellet form, as well as the igniter in a granular form, enables the use of an inflator that delivers hot gas for the purpose of inflating an air bag, the gas being non-toxic and essentially particulate-free. This propellant is about three times as effective as a comparable azide propellant currently used in industry. Because of this, the amount of particulates generated by this propellant is only about 2% of that generated in a comparable azide propellant.

By this invention, the propellant or generant, when ignited by the initiator causes the non-toxic particulate-free effluent to pressurize the cartridge which ruptures the seal and causes the effluent to exhaust through the diffuser into an air bag.

THE DRAWINGS

To demonstrate the effectiveness of the present propellant system, the accompanying drawings are provided wherein:

FIG. 1 provides a comparison of scanning calorimeter traces of two compositions. This has been described above.

FIG. 2 provides an analysis of the exhaust gas provided by burning about 20 gm of an aminoguanidine nitrate/ammonium nitrate eutectic propellant. The exhaust gas was collected in a 60 liter tank and indicates 1500 ppm of carbon dioxide, with a smaller amount of 350 ppm of carbon monoxide. The exhaust gas also contains non-toxic amounts of hydrogen cyanide, formaldehyde, ammonia and nitrogen oxides.

Figure 3:
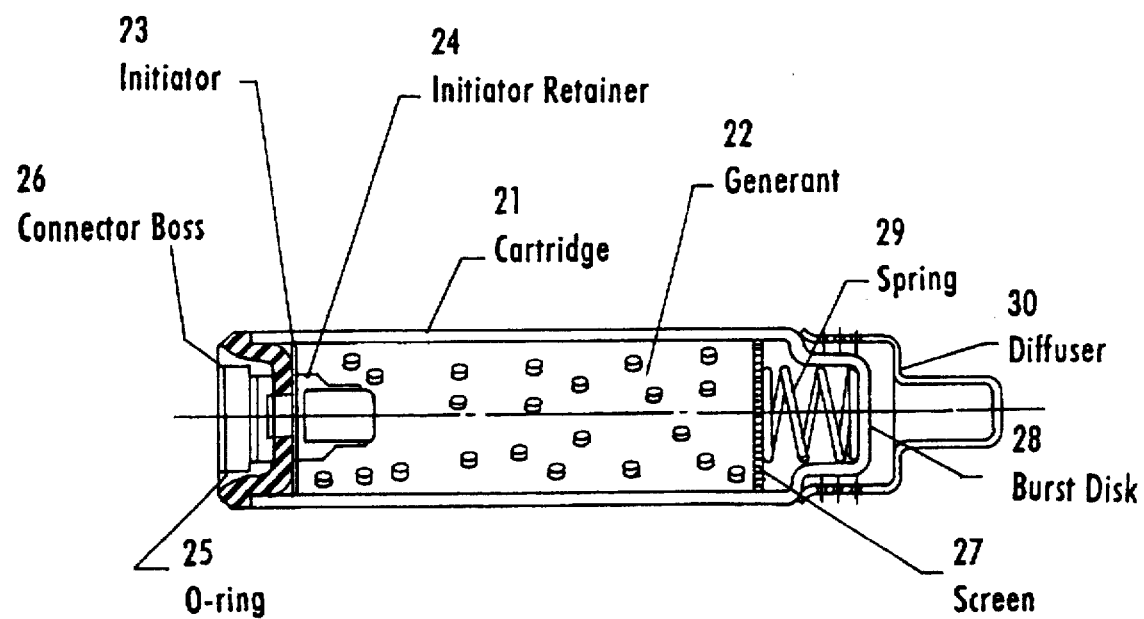
FIG. 3 is a drawing of a pyrotechnic gas generator.

FIG. 3 is a drawing of the pyrotechnic generator of the instant invention. Since no part of the inflator is reserved for storage capacity, the device is smaller than its counterpart hybrid inflator. In this figure, a cartridge (21) holds a generant (22), which may be a eutectic solid solution of GN/AN with at least 5% by weight KN and at least 3% by weight PVA formulated to an oxidizer ratio of about 0.95. At one end of said cartridge (21) is an initiator (23) that will combust in response to a signal from a sensor (not shown) which generates said signal as a result of a change in conditions, e.g., an excessive increase in temperature or a sudden deceleration of a vehicle (indicative of a crash), in which the inflator is installed. The initiator (23) is kept in place by an initiator retainer (24). An C-ring (25) serves as a gasket to render the inflator essentially gas tight in the end where the initiator (23) is located.

The end of the inflator opposite from that containing the initiator (23) holds a screen (27) upon which any particulates in the produced gas are retained, a spring (29) to maintain dimensional stability of the generant bed, and a burst disc (28), which is ruptured when the gas pressure exceeds a predetermined value, permitting the gas to escape from the cartridge (21) through exit ports (not shown) in cartridge (21) wall near the end containing the diffuser (30). To ensure that the expelled gas is not released in an unduly strong stream, a diffuser (30) is affixed to the discharge end of the inflator.

THE EXAMPLES

To illustrate the instant method, the following tests were conducted. In these tests, propellant formulations were prepared by dissolving all the ingredients in water and mixing down to dryness to form granules suitable for pressing. The granules were then compacted into pellets measuring about 0.5 inch diameter ×0.4 inch length. These pellets served as test specimens for temperature cycling tests, where they were subjected to either 200 cycles in the temperature range 40 to +107° C., or 300 cycles in the range −30° to +90° C. The cycle time was three hours and 20 minute/cycle, consisting of 40 minutes cold, 60 minutes warmup, 40 minutes hot, and 60 minutes cooldown.

Measurements of compressive strength (yield) and pellet diameter were made periodically on samples removed from cycling. It was found that many of the pellets gained strength during cycling and essentially all suffered permanent growth. A growth of greater than about 2% was used to disqualify the sample.

The rule of thumb for stabilizing AN with KN is an AN/KN ratio of about 85/15, or 5.67. The goal of these experiments was to maximize this ratio (i.e., minimize the KN content, which is the source of particulates, as $K_2CO_3$)

Amounts up to about 20% wt., based on the propellant of either triaminoguanidine nitrate (TAGN) or nitroguanidine (NQ) may be added as ballistic modifiers to increase burn rate and lower pressure exponent.

Test A

The effect of KN content on the thermal stability of AN/AGN eutectics is summarized in FIG. 4. None of these eutectics survived −40/+107° C. cycling. All of them survived −30/+90° C. cycling, indicating that no more than 3% KN is needed to stabilize these eutectics in this range, resulting in an AN/Kn ration of 21.67, and about 2% particulates (as $K_2CO_3$) in the combustion products.

When AN is not a part of the mixture, stability in the range −40/+107° C. is attained without KN (Comp 103), and the combustion products are particulate-free. However, these propellant compositions are fuel-rich of the oxidation ratio of 0.95, and are only suitable for hybrid inflator systems in which part of the compressed gas is oxygen.

Test B

A number of comparisons are available from the data in FIG. 5, where the stabilities of selected AN/GN eutectics are summarized.

First, Comp 111 shows that PVA alone is not enough to stabilize AN. The cycling was terminated at 25 cycles because of excessive growth. Later in the table, it is shown that KN alone is also not enough. The 50/50 AN/KN eutectic disintegrated after only five cycles.

The effect of KN content is shown in the next four entries (84, 94, 93, and 92). The changes at 3% KN are excessive, so the lowest acceptable KN content in the table is 5%, resulting in about 3.4% particulates in the combustion product (as $K_2CO_3$). The resulting AN/KN ratio is 20, which agrees well with the value of 21.67 in the AN/AGN eutectics, both of which are much greater than the 5.67 without either GN, AGN, or PVA in the eutectic.

The effect of PVA content on stability is shown in the next three entries (120, 121, and 132). Here the lowest acceptable value is 3%. In Comp 121, AN/KN=10.8, but it is possible that a value closer to 20 might be acceptable, in which KN~3%, resulting in about 2% particulates in the combustion products, as $K_2CO_3$. The next two entries (125 and 126) show that the PVA must be dissolved in the eutectic to be effective. Adding the PVA to the AN/GN/KN eutectic as a dry powder resulted in unacceptable changes during cycling.

The last three entries (110, 99, and 114) show that $KClO_4$, is also an effective stabilizer, but probably not as good as KN. Between 6 and 9% $KClO_4$ is required. Taking the latter, the resulting AN/$KClO_4$, ratio is 6.1, in approximate (though probably fortuitous) agreement with the value of 5.67 for AN/KN alone, (i.e., in the absence of a eutectic). The resulting combustion products contain 4.8 particulates (as KCl), comparable to the value of 3.4% particulates as $K_2CO_3$ reported above for eutectics stabilized with KN.

Similar to that found in Test A, when AN is not a part of the mixture, stability in the range −40/+107° C. is attained by the simple two-component mixture COMP 87, composed of 65% GN+35% KP. However, although this propellant formulation has an oxidation ratio of 0.95 and is suitable for use in an all-pyro inflator, it is considerably dirtier than COMP 93, with an ash content of 18.8%.

Only the preferred embodiment of the invention and a few examples of its versatility are shown and described in the present disclosure. It is to be understood that the invention is capable of use in various other combinations and environments and is capable of changes or modifications within the scope of the inventive concept as expressed herein.

Additional objects and advantages of the present invention will become readily apparent to those skilled in this art from the description. As will be realized, the invention is capable of other and different embodiments, and its several details are capable of modifications in various obvious respects, all without departing from the invention. Accordingly, the drawings and description are to be regarded as illustrative in nature, and not as restrictive.

We claim:

1. A pyrotechnic method of generating an essentially particulate-free, non-toxic, odorless and colorless gas comprising the steps:

a) providing a gas generator having an enclosed chamber with exit ports, b) disposing within said chamber, a solid eutectic propellant solution comprising gas-generative effective amounts of ammonium nitrate (AN) and at least one of aminoguanidine nitrate (AGN) and guanidine nitrate (GN), and effective stabilizing amounts of polyvinyl alcohol (PVA) and either potassium nitrate (KN) or potassium perchlorate (KP) as the sole source of gas, and c) providing said solid eutectic solution also as the means for igniting the propellant eutectic solution upon detecting that the pressure chamber is being subjected to a sudden deceleration, whereby gas is essentially instantly generated and conducted through the exit ports of said chamber.

2. The method of claim 1, conducted in an automotive vehicle equipped with at least one air bag in association with said gas generator wherein generated gas, conducted through the exit ports, thereafter enters said air bag, which essentially instantly inflates.

3. The method of claim 2, wherein the propellant eutectic solution includes either at least 5% by weight potassium nitrate or approximately 9% by weight potassium perchlorate and at least 3% by weight polyvinyl alcohol.

4. The method of claim 1 wherein the propellant eutectic solution is present in the form of a pressed pellet exhibiting a grain geometry which is resistant to cracking when subjected to temperature cycling.

5. In a method of essentially instantly generating a gas, wherein a propellant composition is disposed within a chamber in a gas generator and means are provided for igniting said composition in response to the detection of a sudden deceleration, the improvement wherein the igniter comprises a eutectic solution containing ammonium nitrate, at least one of aminoguanidine nitrate and guanidine nitrate, and a minor effective stabilizing amount of each of polyvinyl alcohol and either potassium nitrate or potassium perchlorate.

6. In a process for injection molding a propellant composition containing AN as oxidizer to obtain a pressed propellant pellet, a method for essentially avoiding the presence of cracks and voids in said pressed pellet, including the steps of:

a) mixing the AN oxidizer with effective amounts of at least one of AGN and GN, together with effective stabilizing amounts of PVA and either KN or KP mixture;

b) forming said mixture into a eutectic solution wherein the oxidation ratio of said solution approaches, but is less than, unity; and c) injection molding the eutectic solution into a pellet that does not have tendency to crack, exhibits a reduced phase change of the AN and displays, to some degree, a reduced hygroscopicity.

7. The process of claim 6, wherein the AN oxidizer is mixed with at least one of AGN and GN and at least about 5% by weight each of KN and PVA.

8. The process of claim 6, wherein the AN oxidizer is mixed with at least one of AGN and GN, about 9% KP, and about 5% PVA.

9. The method of claim 1, wherein 5–25% triaminoguanidine nitrate (TAGN) or nitroguanidine (NQ) is added to provide ballistic modification of the burn rate and pressure exponent.

10. A pyrotechnic method of generating an essentially particulate-free, non-toxic, odorless and colorless gas comprising the steps:

a) providing a gas generator having an enclosed chamber with exit ports, b) disposing within said chamber, a solid eutectic propellant solution comprising gas-generative effective amounts of ammonium nitrate (AN) and at least one of aminoguanidine nitrate (AGN) and guanidine nitrate (GN), and effective stabilizing amounts of polyvinyl alcohol (PVA) and either potassium nitrate (KN) or potassium perchlorate (KP) as the sole source of gas, and c) providing said solid eutectic propellant solution with igniting means that ignite upon detecting that the pressure chamber is being subjected to a sudden deceleration, whereby gas is essentially instantly generated and conducted through the exit ports of said chamber.

* * * * *